United States Patent Office 3,055,953
Patented Sept. 25, 1962

3,055,953
ETHYLENE TELOMERS AND PROCESS OF PREPARING SAME
Kenneth C. Smeltz, Wilmington, Del., assignor to E. I. du Pont de Nemours and Company, Wilmington, Del., a corporation of Delaware
No Drawing. Filed June 17, 1960, Ser. No. 36,706
8 Claims. (Cl. 260—653.1)

The present invention is directed to telomers of ethylene and $Br[CF_2CF_2]_nBr$ and more particularly to $$Br[CH_2CH_2]_m[CF_2CF_2]_n[CH_2CH_2]_pBr$$

and $$Br[CF_2CF_2]_n[CH_2CH_2]_pBr$$

as compositions of matter. This invention is also directed to the process for the preparation of said telomers by reacting ethylene with a dibromide of structure $$Br[CF_2CF_2]_nBr$$

in the presence of a free radical generating catalyst.

Although it is well known that fluoroalkyl bromides such as $CF_2BrCl$ [JACS, 77, 768 (1955)], $$CF_2BrCFClBr$$

[JACS, 76, 5423 (1954)] and $CF_2Br_2$ [JACS, 76, 3466 (1954)] react with ethylene in the presence of free radical catalysts to form products of types $$CF_2Cl[CH_2CH_2]_nBr$$

$CF_2BrCFCl[CH_2CH_2]_nBr$ and $CF_2Br[CH_2CH_2]_nBr$, it is generally conceded that compounds of type $YCF_2Br$, wherein Y is a perfluoroalkyl group, do not form telomers. [See Lovelace et al., "Aliphatic Fluorine Compounds," p. 38; Walling, "Free Radicals in Solution," p. 255.] It should be noted also that the compound $CF_2BrCFClBr$ reacts only at the —CFClBr group, no telomer was observed which resulted from reaction of the —CF₂Br group.

It is an object of this invention to prepare telomers from ethylene and dibromides of structure $$Br[CF_2CF_2]_nBr$$

wherein $n$ is an integer of from 1 to 10. It is a further object to prepare telomers of the structure $$Br[CH_2CH_2]_m[CF_2CF_2]_n[CH_2CH_2]_pBr$$

wherein $m$ is an integer from 0 to 5 and $p$ an integer from 1 to 5 in the presence of a free radical generating catalyst.

These and other objects will become apparent in the following description and claims.

It has unexpectedly been found that dibromides of structure $Br[CF_2CF_2]_nBr$ will react with ethylene in the presence of free radical generating catalysts, this being contrary to the teachings and indications of the prior art.

More specifically the present invention is directed to a composition comprising compounds of the structure $Br[CH_2CH_2]_m[CF_2CF_2]_n[CH_2CH_2]_pBr$ wherein $m$ and $p$ are integers of from 1 to 6 and $n$ is an integer of from 1 to 10 and a composition comprising compounds of structure $Br[CF_2CF_2]_n[CH_2CH_2]_pBr$ wherein $n$ is an integer of from 1 to 10 and $p$ is an integer of from 1 to 6.

The present invention is also directed to a process which process comprises reacting dibromoperfluoroalkanes of structure $Br[CF_2CF_2]_mBr$ with ethylene at superatmospheric pressure and at from 50° C. to 200° C. in the presence of a free radical generating catalyst to form products of structure $$Br[CF_2CF_2]_n[CH_2CH_2]_pBr$$

and $Br[CH_2CH_2]_m[CF_2CF_2]_n[CH_2CH_2]_pBr$ wherein $m$, $n$ and $p$ are as defined heretofore.

This invention also relates to the process which comprises reacting compounds of structure $$Br[CF_2CF_2]_n[CH_2CH_2]_pBr$$

with ethylene at superatmospheric pressure and at from 50° C. to 200° C. in the presence of a free radical generating catalyst to form products of structure $$Br[CH_2CH_2]_m[CF_2CF_2]_n[CH_2CH_2]_pBr$$

wherein $m$, $n$ and $p$ are as heretofore described.

The preferred starting materials for the heretofore described processes are, respectively, $Br[CF_2CF_2]_nBr$ wherein $n$ is from 1 to about 5 and $$Br[CF_2CF_2]_n[CH_2CH_2]_pBr$$

wherein $n$ is from 1 to about 5 and $p$ is 1 or 2.

The preferred products of the present invention are $Br[CF_2CF_2]_n[CH_2CH_2]_pBr$ and $$Br[CH_2CH_2]_m[CF_2CF_2]_n[CH_2CH_2]_pBr$$

wherein $m$ and $p$ are 1 or 2 and $n$ is from 1 to about 5. The latter type of product is preferred to the former.

The processes of the present invention may be carried out in either a batch or continuous manner. The continuous process is preferred from an economic standpoint.

A variety of free radical generating catalysts are known to the art. These include azo compounds such as a,a'-azobis-isobutyronitrile, acyl peroxides such as benzoyl or acetyl peroxide, and alkyl peroxides such as di-t-butyl peroxide. All types are useful in the present process. These catalysts vary particularly in the temperature at which they decompose at a convenient rate to form free radicals which will initiate chain reactions. Thus, for a,a'-azobis-isobutyronitrile the temperature is about 50° C., for benzoyl peroxide about 80–100° C. and for di-t-butyl peroxide about 120–150° C. The preferred catalyst in the present process is di-t-butyl peroxide and the preferred reaction temperature is in the range 120–160° C.

No solvent is necessary or desirable in the present process. The starting dibromides and the crude product are liquids at the preferred reaction temperature.

The reaction pressure in the present processes is not constant but varies with both the type of system used, batch or continuous, and the course of the reaction. The pressure is determined almost entirely by the concentration of ethylene present. In a batch process, the initial pressure is due to the initial ethylene concentration and the pressure falls as ethylene is consumed. In a continuous system, the pressure is determined by the ethylene concentration desired and the reaction temperature; in this case the pressure remains essentially constant.

The dibromides $Br[CF_2CF_2]_nBr$ used as starting materials are readily available. The first member of the series ($n=1$) is commercially available; its primary uses being as a fire-extinguishing agent and as a refrigerant. The other members of the series ($n=2$, 3, 4 etc.) are readily prepared by reacting the first member ($n=1$) with tetrafluoroethylene in the presence of a free radical catalyst. A typical preparation follows.

The reaction was carried out in a continuous system comprising a 1.4 l. autoclave equipped with a liquid feed-pump, a tetrafluoroethylene compressor, a gas-phase scrubber (for removing the inhibitor from tetrafluoroethylene) containing silica-gel following the compressor and a product discharge control valve which maintains a constant pressure within the autoclave while continuously discharging product. Tetrafluoroethylene in contact with silica-gel in the inhibitor scrubber generates considerable heat; as a matter of caution, careful control of the temperature within the scrubber is necessary. If the temperature is allowed to greatly exceed 50° C. a violent, highly exothermic reaction can occur which can cause considerable destruction.

The autoclave was charged liquid full with 1,2-dibromotetrafluoroethylene containing 0.2% di-t-butyl peroxide and was heated to 175° C. The autoclave pressure was maintained at 450 p.s.i.g. Tetrafluoroethylene was compressed to 500 p.s.i.g. and admitted into the autoclave. 1,2-dibromotetrafluoroethylene containing 0.2% di-t-butyl peroxide was pumped into the autoclave at the same time by means of a high pressure positive displacement pump. The feed rate of the two reactants was adjusted so that 3.8 moles of dibromide per mole of tetrafluoroethylene were fed. The liquid product which discharged continuously from the autoclave was collected and fractionally distilled giving, besides starting materials:

(a) 1,4-dibromooctafluorobutane $Br[CF_2CF_2]_2Br$, B.P. 98–99° C. Found: C, 13.7; F, 42.2; Br, 43.3; M.W. 360.
Analysis.—Calcd. for $C_4F_8Br_2$: C, 13.3; F, 42.3; Br, 44.5; M.W., 360.

(b) 1,6-dibromododecafluorohexane $Br[CF_2CF_2]_3Br$, B.P. 90–92.5/150 mm.
Analysis.—Calcd. for $C_6F_{12}Br_2$: C, 15.6; F, 49.6; Br, 34.8; M.W., 460. Found: C, 15.8; F, 48.7; Br, 33.4; M.W. 463.

(c) 1,8-dibromohexadecafluorooctane $Br[CF_2CF_2]_4Br$, B.P. 115–116.5/100 mm., M.P. 36–37° C.
Analysis.—Calcd. for $C_8F_{16}Br_2$: C, 17.1; F, 54.3; Br, 28.6; M.W., 560. Found: C, 16.9; F, 56.6; Br, 27.8; M.W., 598.

(d) 1,10-dibromoeicosofluorodecane $Br[CF_2CF_2]_5Br$, B.P. 106–107.5/20 mm., M.P. 73.5–77° C.
Analysis.—Calcd. for $C_{10}F_{20}Br_2$: C, 18.2; F, 57.6; Br, 24.3; M.W., 660. Found: C, 18.1; F, 59.5; Br, 23.0; M.W., 659.

(e) 1,12-dibromotetracosafluorododecane $$Br[CF_2CF_2]_6Br$$

B.P. 133–135°/10 mm., M.P. 88–94° C.

(f) 1,14-dibromooctacosafluorotetradecane $$Br[CF_2CF_2]_7Br$$

B.P. 173–175° C./10 mm., M.P. 152–153° C.

In carrying out the process of the present invention in a batchwise manner, the dibromide $Br[CF_2CF_2]_nBr$ and the catalyst are placed in a pressure vessel, ethylene is admitted and the system is heated at the desired temperature until the ethylene has been consumed. If desired, further ethylene may then be added and the reaction continued. The system is then cooled and the contents are fractionally distilled. Any recovered starting material may be reused if desired.

When using a continuous system, the dibromide, ethylene and catalyst are fed into an autoclave in a manner analogous to that described for the preparation of the dibromides $Br[CF_2CF_2]_nBr$ with the exception that ethylene usually contains no inhibitor which must be removed. The products are collected and fractionated as before.

The following representative examples illustrate the present invention.

*Example 1*

1,4-dibromooctafluorobutane [360 g., 1.0 mole], di-t-butyl peroxide [2.19 g., 0.015 mole] and ethylene [7.0 g., 0.25 mole, 4 moles dibromide/mole ethylene] were charged into a 400 ml. shaker tube and heated to 140° C. (pressure 150 p.s.i.g.). After heating at 140° for 15 minutes the pressure had dropped to about 0 p.s.i.g., heating was continued for an additional 15 minutes. After cooling, the product was collected (96.8% recovery) and fractionally distilled, giving $Br[CF_2CF_2]_2Br$ (274 g.), $Br[CF_2CF_2]_2CH_2CH_2Br$ (53.4 g., 57% yield), B.P. 67.5–68.5° C., $n_D^{25}$ 1.3867, and a fraction composed predominantly of $Br[CF_2CF_2]_2[CH_2CH_2]_2Br$, B.P. 86.5°/5 mm. (25.3 g).

Analysis.—Calcd. for $C_6H_4F_8Br_2$: C, 18.6; H, 1.03; F, 39.2; Br, 41.3. Found: C, 18.8; H, 1.00; F, 39.3; Br, 40.5.

Analysis.—Calcd. for $C_8F_8H_8Br_2$: C, 23.1; H, 1.92; F, 36.5; Br, 38.5; M.W., 416. Found: C, 23.3; H, 2.00; F, 36.2; Br, 37.6; M.W., 415.

Trace amounts of $Br[CF_2CF_2]_2[CH_2CH_2]_pBr$, $p=3$, 4 and 5 were also isolated. The nuclear magnetic resonance (NMR) spectra of these products were consistent with the structure assigned.

*Example 2*

Using the procedure of Example 1, 1,4-dibromooctafluorobutane (180 g., 0.5 mole), di-t-dibutyl peroxide (0.73 g., 0.005 mole) and ethylene (28 g., 1.0 mole, 0.5 mole dibromide/mole ethylene) were caused to react at 140° C. After 2.5 hours, the pressure dropped from 650 p.s.i.g. to 400 p.s.i.g. and then remained constant for two hours. The product was fractionally distilled, giving $Br[CF_2CF_2]_2Br$ (83.8 g.), $Br[CF_2CF_2]_2CH_2CH_2Br$ (18.6 g., 19.3% yield), $Br[CF_2CF_2]_2[CH_2CH_2]Br$ (48.2 g., 50.8% yield), B.P. 74–76° C./2 mm. and $$Br[CH_2CH_2]_2[CF_2CF_2]_2[CH_2CH_2]_2Br$$

(3 g., 3.1% yield), M.P. 66.5–68° C. The latter compound was identified by its nuclear magnetic resonance (NMR) spectrum.

*Example 3*

1,4-dibromooctafluorobutane (360 g., 1 mole), di-t-butyl peroxide (2.92 g., 0.02 mole) and ethylene (7.0 g., 0.25 mole) were charged into a 400 ml. shaker tube and heated at 140° C. After 4 minutes, the pressure had dropped from 200 to 10 p.s.i.g. The tube was repressured with ethylene to 210 p.s.i.g., said pressure decreasing to 30 p.s.i.g. in 3 minutes at 140° C. Repressuring was continued as follows:

30 p.s.i.g. $\xrightarrow{C_2H_4}$ 180 p.s.i.g. $\xrightarrow{3\,min.}$ 0 p.s.i.g. $\xrightarrow{C_2H_4}$ 180 p.s.i.g. $\xrightarrow{4\,min.}$ 20 p.s.i.g. $\xrightarrow{C_2H_4}$ 200 p.s.i.g. $\xrightarrow{5\,min.}$ 10 p.s.i.g. $\xrightarrow{C_2H_4}$ 200 p.s.i.g. $\xrightarrow{8\,min.}$ 0 p.s.i.g. $\xrightarrow{C_2H_4}$ 180 p.s.i.g. $\xrightarrow{13\,min.}$ 0 p.s.i.g.

The tube was then cooled and 386 g. of liquid collected. Fractional distillation at reduced pressure gave $Br[CF_2CF_2]_2Br$ (99.1 g.), $Br[CF_2CF_2]CH_2CH_2Br$ (116.5 g), $Br[CF_2CF_2]_2[CH_2CH_2]_2Br$ (75 g.) and $$BrCH_2CH_2[CF_2CF_2]_2CH_2CH_2Br$$

(10 g.), M.P. 53.5–54.5° C.
Analysis.—Calcd. for $C_8H_8F_8Br_2$: C, 23.1; H, 1.92; F, 36.5; Br, 38.5. Found: C, 23.1; H, 1.95; F, 36.6; Br, 38.2.

The NHR spectrum was consistent with the structure assigned.

*Example 4*

Using the procedure described in Example 1, 1,6-dibromododecafluorohexane (368 g., 0.8 mole), di-t-butyl peroxide (2.92 g., 0.02 mole) and ethylene (6 g., 0.21 mole, 4 moles dibromide) mole ethylene were charged into a 400 ml. shaker tube and heated to 140° C. Reaction began at 124° C. The pressure dropped from 170 p.s.i.g. to 0 p.s.i.g. in 20 minutes; heating was continued for another 10 minutes. After cooling, 375 g. of product were collected which, when fractionally distilled at reduced pressure, gave Br[CF$_2$CF$_2$]$_3$Br (317 g.), $$Br[CF_2CF_2]_3CH_2CH_2Br$$

(50 g.) B.P. 105–107°/30 mm., 61.5/15 mm. and $$Br[CF_2CF_2]_3[CH_2CH_2]_2Br$$

B.P. 82°/1.0 mm. These two products were identified by their NMR spectra.

*Example 5*

1,6 - dibromo - 1,1,2,2,3,3,4,4 - octafluorohexane

[Br(CF$_2$CF$_2$)$_2$CH$_2$CH$_2$Br]

(179.0 g., 0.46 mole), di-t-butyl peroxide (2.92 g., 0.02 mole) and ethylene (6.0 g., 0.214 mole) were charged into a 400 ml. shaker tube and heated to 150° C. Reaction began at 142° C. The pressure fell from 170 p.s.i.g. to 0 p.s.i.g. in 5 minutes. The system was repressured to 240 p.s.i.g. with ethylene and the temperature was increased to 160° C. After 9 minutes, the pressure had dropped to 0 p.s.i.g.

The product (188 g.) was collected and fractionally distilled at reduced pressure, giving starting material Br[CF$_2$CF$_2$]$_2$CH$_2$CH$_2$Br (90 g.), $$BrCH_2CH_2[CF_2CF_2]_2CH_2CH_2Br$$

(37.7 g.) and a smaller amount of $$BrCH_2CH_2[CF_2CF_2]_n[CH_2CH_2]_2Br$$

*Example 6*

Using the procedure of Example 3, 1,2-dibromotetrafluoroethane (325 g., 1.25 mole) and di-tert-butyl peroxide (3.6 g.) were charged into a 400 ml. shaker tube. Ethylene at 200 p.s.i.g. pressure was charged into the tube which was then heated to 150° C. As in Example 3, ethylene was recharged to 200 p.s.i.g. each time the pressure reached 0 p.s.i.g. a total of seven times.

The product was then distilled giving BrCF$_2$CF$_2$Br (36%), BrCF$_2$CF$_2$CH$_2$CH$_2$Br, B.P. 60° C./50 mm. (27% conversion) and BrCF$_2$CF$_2$[CH$_2$CH$_2$]$_2$Br, B.P. 81–82.5° C./10 mm. (10% conversion). The structure of the two products was determined by nuclear magnetic resonance.

It should be noted in these examples that reaction with ethylene may occur with both bromine atoms of the dibromides Br[CF$_2$CF$_2$]$_n$Br but that reaction with ethylene occurs only at the —CF$_2$Br group of $$Br[CF_2CF_2]_n[CH_2CH_2]_pBr$$

*Example 7*

1,8 - dibromo-3,3,4,4,5,5,6,6-octafluorooctane (55.5 g., 0.134 mole) and tri-n-butylamine (99 g., 0.534 mole) were placed in a 500 ml. flask fitted with a thermometer, a 12 inch fractionation column containing ⅛ inch glass helicas, a distillation head and a receiver. The contents of the flask were heated at 184±4° C. for 2 hours during which time a liquid distilled at 120–125° C. The pot temperature was then increased to 227° C. while product continued to distill. When the distillation temperature reached 197° C., the reaction was stopped.

The crude product (36.3 g.) was taken up in ether and dried over anh. magnesium sulfate. Fractionation of the dried ether solution gave two fractions:

(1) B.P. 43–66.5° C./100 mm., 4.1 g.
(2) B.P. 67–67.5° C./100 mm., 21.3 g.

Fraction 1 contained ether. Fraction 2 was pure $$CH_2=CH(CF_2CF_2)_2CH=CH_2$$

(3,3,4,4,5,5,6,6 - octafluoro - 1,7-octadiene). It showed a single adsorption band for C=C at 6.06µ in the infra-red. The nuclear magnetic resonance spectrum was consistent with the assigned structure.

*Analysis.*—Calcd. for C$_8$H$_6$F$_8$: C, 37.8; H, 2.36; F, 59.9; Bromine No., 126. Found: C, 37.9; H, 2.45; F, 58.8; Bromine No., 122.

*Example 8*

Using essentially the same procedure as described in Example 1, 1,6 - dibromo-3,3,4,4-tetrafluorohexane (31.6 g., 0.1 mole) and tri-n-butylamine (74.2 g., 0.4 mole) were caused to react. The crude olefin, B.P. 72–149° C. (34.4 g.) was collected and washed with dil. hydrochloric acid. The water insoluble oil (17.0 g.) was fractionated giving pure CH$_2$=CHCF$_2$CF$_2$CH=CH$_2$ (3,3,4,4-tetrafluoro-1,5-hexadiene), B.P. 72–73° C.

*Analysis.*—Calcd. for C$_6$H$_6$F$_4$: C, 46.7; H, 3.9. Found: C, 46.9; H, 4.3.

Nuclear magnetic resonance, referred to in the examples, is an analytical method which has gained increasing importance recently. The method takes advantage of certain magnetic properties possessed by the nuclei of many elements. The spectra obtained are affected not only by the atomic nuclei concerned but also by their chemical environment. Description of this method is given by H. S. Gutowsky in "Physical Methods in Chemical Analysis," W. E. Berl, editor, vol. III, p. 303. The method is particularly useful in determining the structure of compounds containing hydrogen and fluorine. Thus, if it is known from chemical evidence that a compound could be either BrCF$_2$CF$_2$CF$_2$CF$_2$CH$_2$CH$_2$CH$_2$CH$_2$Br or BrCH$_2$CH$_2$CF$_2$CF$_2$CF$_2$CF$_2$CH$_2$CH$_2$Br, the NMR spectrum of the compound will establish without doubt which isomer is present. Note that the former compound has a CF$_2$ group adjacent to bromine, a CF$_2$ adjacent to CH$_2$, a CH$_2$ adjacent to CF$_2$ and a CH$_2$ adjacent to Br while the latter has 2 CF$_2$ groups adjacent to CH$_2$, 2 CH$_2$ groups adjacent to CF$_2$ and 2 CH$_2$ groups adjacent to Br. The spectra of each compound, based on these relationships, can be predicted with certainty and compared with the spectrum obtained. It is also possible, using NMR, to distinguish between BrCH$_2$CH$_2$[CF$_2$CF$_2$]$_2$CH$_2$CH$_2$Br and $$BrCH_2CH_2[CF_2CF_2]_3CH_2CH_2Br$$

and similar cases since the former will have 2 CF$_2$ groups adjacent only to CF$_2$ while the latter has four.

The product dibromides Br[CF$_2$CF$_2$]$_n$[CH$_2$CH$_2$]$_p$Br and Br[CH$_2$CH$_2$]$_m$[CF$_2$CF$_2$]$_n$[CH$_2$CH$_2$]$_p$Br have a number of uses. These bromides may be converted to the following representative derivatives by standard chemical means:

(1) Br[CF$_2$CF$_2$]$_n$[CH$_2$CH$_2$]$_p$OH
(2) Br[CF$_2$CF$_2$]$_n$[CH$_2$CH$_2$]$_{p-1}$CH$_2$CO$_2$H
(3) Br[CF$_2$CF$_2$]$_n$[CH$_2$CH$_2$]$_p$NH$_2$
(4) HO[CH$_2$CH$_2$]$_m$[CF$_2$CF$_2$]$_n$[CH$_2$CH$_2$]$_p$OH
(5) HO$_2$CCH$_2$[CH$_2$CH$_2$]$_{m-1}$[CF$_2$CF$_2$]$_n$[CH$_2$CH$_2$]$_{p-1}$CH$_2$CO$_2$H
(6) NH$_2$[CH$_2$CH$_2$]$_m$[CF$_2$CF$_2$]$_n$[CH$_2$CH$_2$]$_p$NH$_2$

The alcohols, acids and amines are useful for preparing condensation polymers, esters which may be used as lubricants, surface active agents, oil and water repellents and the like. The dibromides may also be converted to the olefins Br[CF$_2$CF$_2$]$_n$[CH$_2$CH$_2$]$_{p-1}$—CH=CH$_2$ and CH$_2$=CH[CH$_2$CH$_2$]$_{m-1}$

[CF$_2$CF$_2$]$_n$[CH$_2$CH$_2$]$_{p-1}$CH=CH$_2$ by treatment with a base such as KOH or a tertiary amine. These olefins are useful for preparing polymers and copolymers, epoxides and diepoxides.

Any of the heretofore described free radical catalysts and dibromides may be substituted in the preceding examples to give essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition comprising compounds of the structure $Br[CH_2CH_2]_m[CF_2CF_2]_n[CH_2CH_2]_pBr$, in which structure $m$ and $p$ are integers within the range of 1 to 6, and $n$ is an integer within the range of 1 to 10.

2. A composition according to claim 1 wherein integers $m$ and $p$ of said structure are within the range of 1 to 2 and integer $n$ is within the range of 1 to 5.

3. A composition comprising compounds of the structure $Br[CF_2CF_2]_n[CH_2CH_2]_pBr$, in which structure $n$ is an integer within the range of 1 to 10, and $p$ is an integer within the range of 1 to 6.

4. A composition according to claim 3 wherein integer $n$ of said structure is within the range of 1 to 5, and integer $p$ is within the range of 1 to 2.

5. A process of preparing products having the structure taken from the group consisting of $$Br[CF_2CF_2]_n[CH_2CH_2]_pBr$$

and $Br[CH_2CH_2]_m[CF_2CF_2]_n[CH_2CH_2]_pBr$, in which process dibromoperfluoroalkanes having the structure $Br[CF_2CF_2]_nBr$ are reacted with ethylene at superatmospheric pressure and at a temperature within the range of 50° C. to 200° C. in the presence of a free radical generating catalyst, $n$ of said dibromoperfluoroalkane is within the range of 1 to 10, in which products $m$ and $p$ are integers within the range of one to six.

6. A process according to claim 5 wherein integer $n$ of the dibromoperfluoroalkane has a value within the range of 1 to 5, $m$ and $p$ are integers within the range of one to two.

7. A process for forming products having the structure $Br[CH_2CH_2]_m[CF_2CF_2]_n[CH_2CH_2]_pBr$, in which structure $n$ is an integer within the range of 1 to 10, and $m$ and $p$ are integers within the range of 1 to 6, said process comprising reacting compounds having the structure $Br[CF_2CF_2]_n[CH_2CH_2]_pBr$ with ethylene at superatmospheric pressure, at a temperature within the range of 50° C. to 200° C. in the presence of a free radical generating catalyst.

8. A process according to claim 7 wherein integer $n$ of the compound of the structure $$Br[CF_2CF_2]_n[CH_2CH_2]_pBr$$

is from 1 to 5 and $p$ of said compound is 1 to 2.

References Cited in the file of this patent

UNITED STATES PATENTS

| | | |
|---|---|---|
| 2,594,184 | Ladd | Apr. 22, 1952 |
| 2,875,253 | Barnhart | Feb. 24, 1959 |